Dec. 18, 1951  F. A. G. KOENIG  2,579,236
MULTIPLE COLUMN MECHANICAL COUNTER
Filed Oct. 17, 1947  3 Sheets-Sheet 3
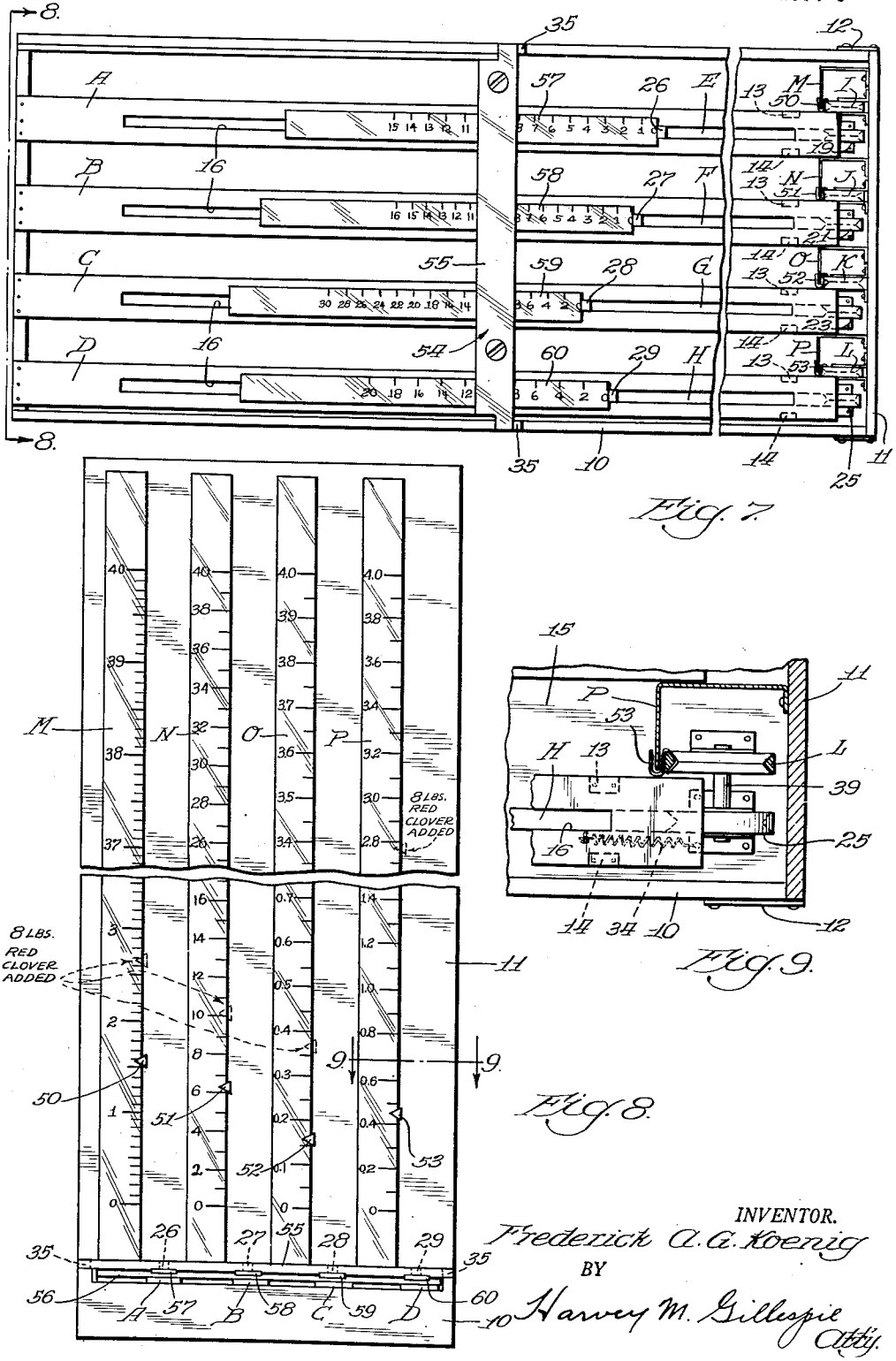
INVENTOR.
Frederick A. G. Koenig
BY
Harvey M. Gillespie
Atty.

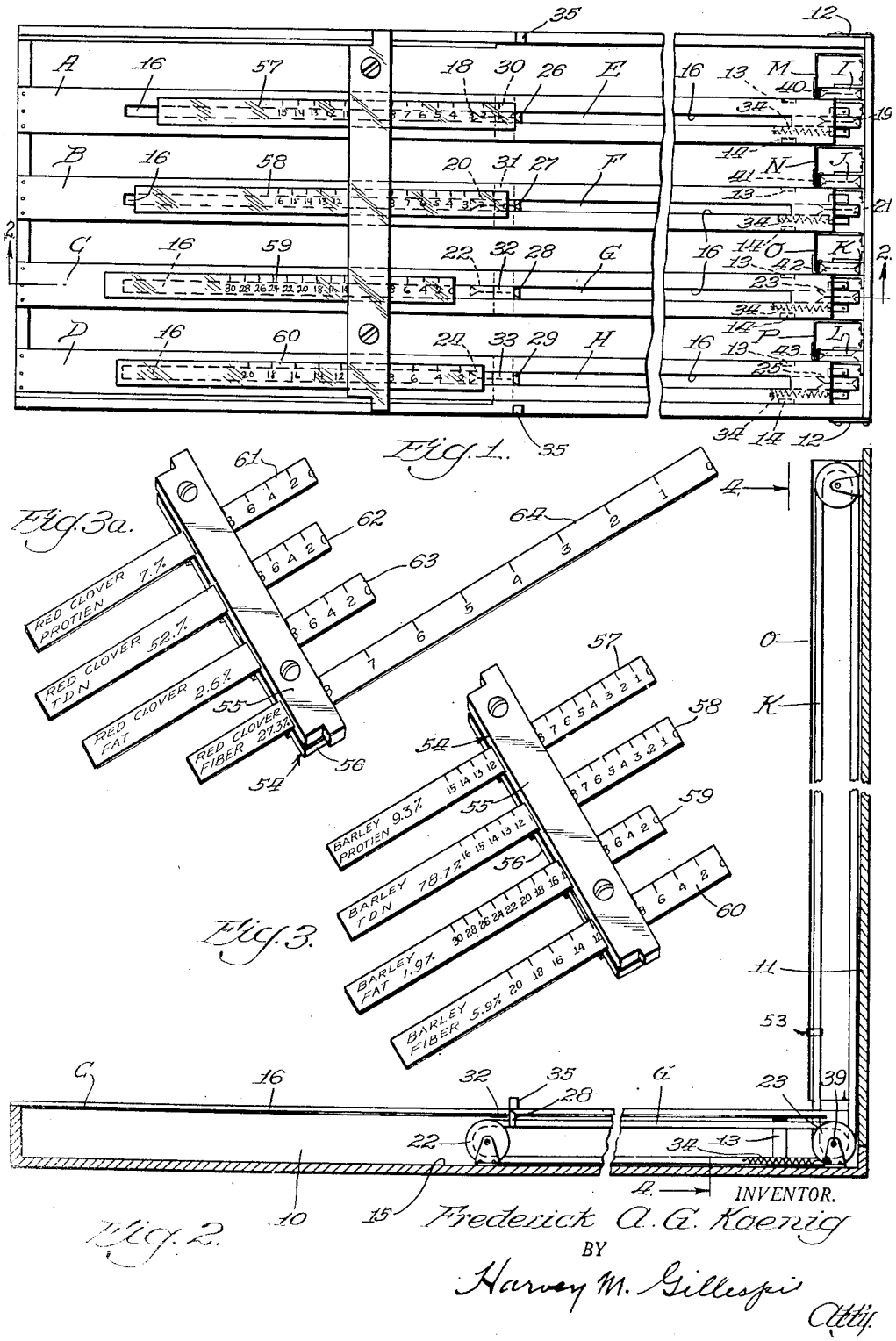

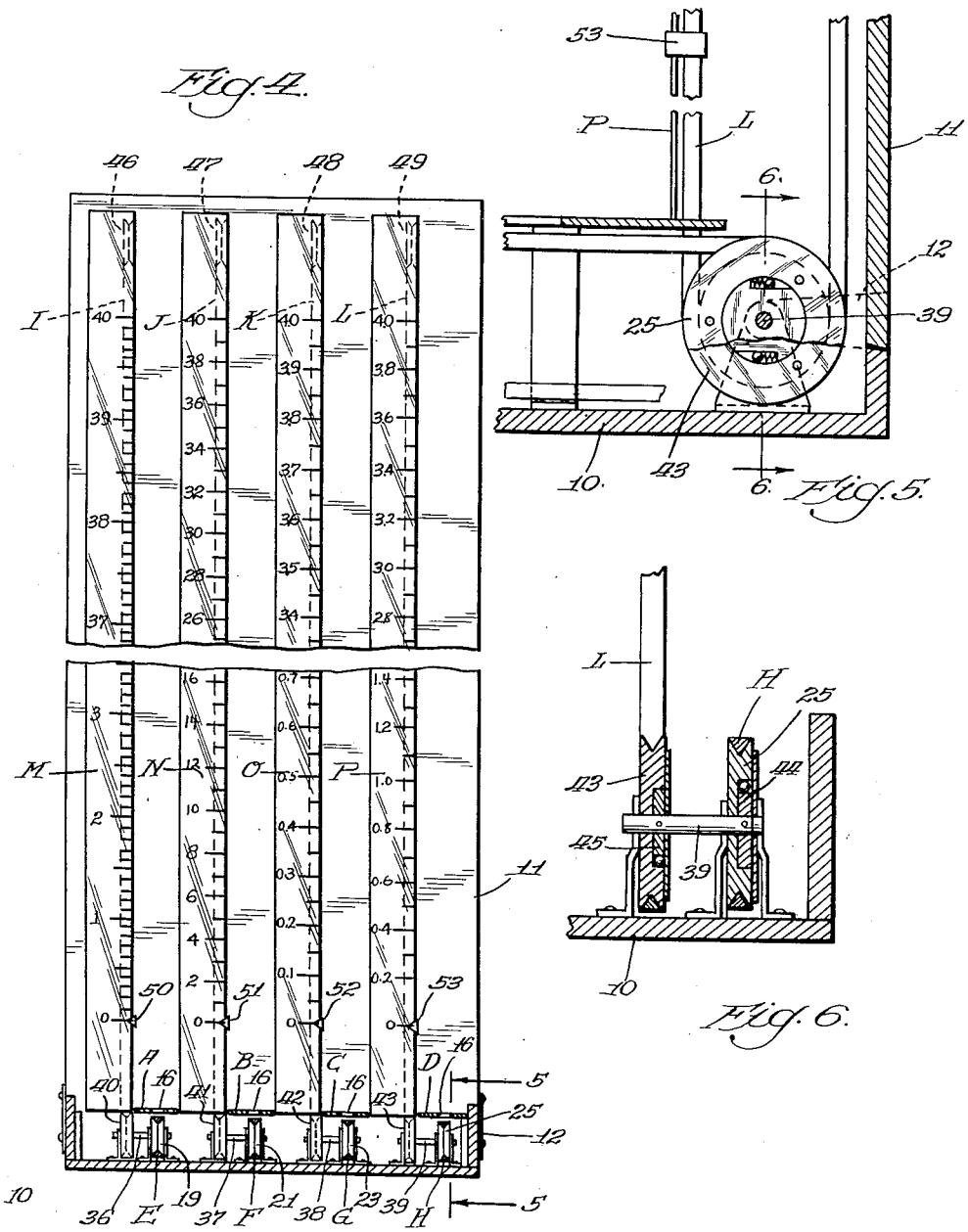

Patented Dec. 18, 1951

2,579,236

UNITED STATES PATENT OFFICE 2,579,236

MULTIPLE COLUMN MECHANICAL COUNTER

Frederick A. G. Koenig, Chicago, Ill., assignor to Anna C. Koenig, Chicago, Ill.

Application October 17, 1947, Serial No. 780,346

5 Claims. (Cl. 235—71)

This invention relates to improvements in mechanical counting apparatus and has for its principal object the provision of a simplified multiple column mechanical counter which will function to simultaneously compute and indicate the values of various components contained in a given quantity or unit of measure or in any desired multiple thereof.

Another object of the invention is to provide a machine which is particularly suitable for performing in a more facile manner the series of separate computations disclosed in my co-pending application Serial No. 736,054, filed March 20, 1947, now Patent No. 2,487,342, or other computations of similar character in which the amounts of a plurality of components, having different values in different materials, are computed and indicated to cover the total of each component contained in a mixture, blend, compound or group of different materials.

A further object of the invention is to provide a computing machine which is adapted for use in any situation wherein it may be desirable to indicate the total values of separate components contained in different amounts in various increments of measure or quantities of materials used in a computation.

In order to illustrate the principles of the invention, the present disclosure includes a machine having an actuating element which is designed for use in connection with computations showing the amounts of protein, total digestible nutrients, fat, and fiber components contained in a stock feed ration composed of one or more feeds. Each feed is represented by a separate actuating element the parts of which may be adjusted to correspond to the amount of such feed used.

Instead of computing the nutrient and fiber components of a stock ration the actuating element might obviously represent selected nutrients contained of any food such as meat, vegetables and grain. Such nutrients may be expressed in amounts of protein, iron, phosphorous and fat or the values may be expressed in calories and vitamins contained in the foods of a selected diet.

The invention therefore includes, as one of its specific objects, the provision of a novel and improved actuator formed to represent the values of several components contained in a unit of measure or quantity used in a computation. In this connection the invention contemplates specifically the provision of an actuator having a plurality of adjustable scale elements each of which represents the value expressed in linear measure of a specified component contained in a given unit of measure, for example, in a specified measure or weight of material.

The principles of the present invention are embodied in a simplified form of machine disclosed in the drawings.

Fig. 1 is a plan view of the machine.

Fig. 2 is a longitudinal section taken on line 2—2 of Fig. 1.

Fig. 3 is a view in perspective of an actuator element representing the relative amounts of several components contained in a selected material.

Fig. 3a is a view in perspective of a like actuator device constructed to represent the amounts of various components contained in another material.

Fig. 4 is a sectional view taken substantially on line 4—4 of Fig. 2 and looking in the direction indicated by the arrows.

Fig. 5 is an enlarged sectional view showing the operative connections of a pointer operating means and a reciprocating element for imparting movement to the pointer operating means.

Fig. 6 is a fragmentary sectional view taken on line 6—6 of Fig. 5.

Fig. 7 is a plan view similar to Fig. 1 but illustrating the actuator element moved to a different position.

Fig. 8 is a front view of the mechanical counter showing indicator scales and illustrating the pointers moved to the positions on said indicator scales to indicate the values of the several components contained in the amount of material for which the actuator is set.

Fig. 9 is a fragmentary plan view partly in section taken on line 9—9 of Figure 8.

The mechanical counter as shown herein comprises a base 10 in the form of a rectangular box and a closure lid 11 hinged to the base by hinge elements 12. A plurality of guide strips A, B, C and D are arranged in spaced relation to each other. Each strip is secured at one end to the upper edge of one end portion of the base 10 and is provided at the other end with a pair of legs 13—14 which are secured to the upper face of the bottom 15 of the base. Each guide strip is provided with a longitudinally extending slot 16 which extends substantially the full length of the strip so as to provide guide slot for guiding an actuator element.

Positioned beneath the slots 16 of the several guide strips are arranged endless belts designated E, F, G and H. These belts are of identical construction and are mounted on pairs of grooved pulleys. The pulleys for belt E are designated 18—19 and the pairs of pulleys for the belts F, G and H are designated 20—21, 22—23 and 24—25, respectively. The several belts are separately operable and are provided with fingers 26, 27, 28 and 29 which extend upwardly through the slots 16 of the several guide strips so as to be engaged by the several actuating scales of the actuator. The said fingers are normally held against stop bars 30, 31, 32 and 33, respectively, which are secured to the under surfaces of the several guide strips A, B, C and D. Coiled tension springs 34 shown best in Figs. 1 and 2 are connected to the belts E, F, G and H so as to return the belts and their fingers 26, 27, 28 and 29 to their normal position after each forward operating movement of the belts.

The pulleys 19, 21, 23 and 25 are supported on shafts 36, 37, 38 and 39 and are referred to herein as operating pulleys, since they serve to operate companion pulleys 40, 41, 42 and 43 which are also mounted on said shafts. The operating and companion pulleys of each set are operatively connected to their associated shaft by means of one-way roller clutches. The roller clutches 44 and 45 for one pair of operating and companion pulleys are shown in Figs. 5 and 6. All of said clutches are of the same conventional construction. They include a roller arranged in a slot of decreasing depth so as to function, when the operating pulleys rotate in a clockwise direction, to clutch the pulleys to their respective shafts, but permit reverse movement of the pulleys free of the shafts. It will be observed, therefore, that the forward operation of the belts E, F, G and H impart clockwise movements to their pulleys 19, 21, 23 and 25 and that the said clockwise movements of the pulleys impart clockwise movements of corresponding amplitudes to the companion pulleys 40, 41, 42 and 43. The said companion pulleys being connected to the said shafts by means of one-way roller clutches 45.

The said companion pulleys constitute parts of an indicating mechanism carried on the cover panel 11. The said indicating mechanism includes verticaly movable belts I, J, K and L which extend around the said pulleys 40, 41, 42 and 43 over idler pulleys 46, 47, 48 and 49 secured to the cover panel 11 near the upper ends thereof. The said vertically movable belts and the pulleys associated therewith are positioned back of vertically extending indicating scales M, N, O and P carried on said cover panel. The said indicating scales are preferably so positioned that when the cover panel 11 is lowered to its closed position the indicating scales will move into the spaces at the sides of the guide strips A, B, C and D.

The vertically movable belts are provided with pointer clips 50, 51, 52 and 53 which overlie the front faces of the indicating scales M, N, O and P to separately indicate the amounts of the several components which enter into a specified computation. For example when the indicating scales M, N, O and P represent selected nutrients contained in a ration or diet, the pointers will indicate the amounts of said selected nutrients contained in the volume of materials used in the ration or diet.

In the counter herein shown for the purpose of illustration, the indicating scales represent the components protein, total digestible nutrients, fat and fiber contained in various materials used in a balanced ration or diet.

In this connection the invention contemplates the use of a plurality of actuating elements, one for each material used in said ration or diet. One of such actuators is shown in Fig. 3. It is composed of a bridge portion 54 comprising upper and lower clamp plates 55 and 56 and a plurality of measuring scales 57, 58, 59 and 60 which are adjustably held in clamped relation between said upper and lower plates. The graduations on the scale 57 are spaced apart to indicate, in linear measure, the quantity of protein contained in one pound of barley. The graduations on the scales 58, 59 and 60 represent, in linear distances, the amounts of total digestible nutrients, fat and fiber, respectively, contained in each pound of barley.

The metered spaces on the several scales of any actuator used are proportional to the metered spaces on the indicating scales M, N, O and P in the same relation as their total percent length of the measuring scales stand to the total percent length of the indicating scales for the same component. This condition is obtained as follows: The indicating scales are based upon a predetermined linear measure and the legend spaces represent equal one hundredth parts of that measure. The several component scales of an actuator is based upon a percent of the base linear measure of said indicator scales. That is to say, a scale representing the amount of protein contained in barley (9.3 pounds per hundred) is based upon a linear measure equal to 9.3 of the total basic length of the indicating scale M. The said linear distance on which said actuator scale is based is divided into one hundred equal spaces. Each of the spaces shown on the actuator scale represents, in linear measure, the amount of protein contained in one pound of barley. The linear distances of the spaces on the other component scales of the actuator are determined in the same manner in accordance with their percentage relationship.

The indicator scales M, N, O and P may be based upon the same or different linear measures. It is convenient, however, when the component content of a material is relatively high in proportion to the total amount of material, to reduce the basic length for the indicator scale representing that component. For example the total digestible nutrient contained in barley amounts to 78.7% of the total weight. Consequently the basic length of the scale indicating the total digestible nutrients is based on a linear measure which is shorter than the basic measure for the protein indicating scale. Also the fat content is frequently quite low in some materials, for example 1.9% in barley. Consequently it is convenient to construct the indicator scale O for this component on a linear distance twice the length used in the construction of the protein scale M.

Each of the actuating scales shown in Fig. 3 are set to indicate the use of eight pounds of barley. Consequently, the aggregate length of the graduations 1 to 8, on each of the scales, represent the total of the specified nutrient contained in the material used, to-wit, 8 pounds of barley. Inasmuch as this material (barley) represented by the actuator 54 contains different amounts specified components, the actuating scales representing these components are constructed in the manner above described and extend different distances outwardly from the clamping plates 55, 56. Consequently, when the actuator is placed on the guide strips A, B, C and D and moved toward stops 35—35 the ends of the several scales 57, 58, 59 and 60 will engage the upwardly extending fingers 26, 27, 28 and 29, respectively, and thereby move the belts E, F, G and H forward for distances corresponding to the linear distances of the graduations 1 to 8, inclusive, on the several measuring scales. This movement of the horizontal belts imparts corresponding movements to the vertical belts and consequently moves the pointers 50, 51, 52 and 53 to positions on the vertical scales corresponding to the lengths of the several actuator scales. Consequently the pointer 50 representing the protein content will be moved to 1.57 on scale M to indicate the amount of protein contained in 8 pounds of barley. The pointer 51 will be moved to a position on scale N to indicate the amount of total digestible nutrients contained in 8 pounds of barley and the pointers 52 and 53 will be moved to the positions required to show the amount of fat and fiber, respectively, contained in 8 pounds of barley. When the actuator element is returned to its starting position the spring 34 returns the fingers 26, 27, 28 and 29 to their starting position. If the same actuator element is again moved forward to impart corresponding movements to the horizontal belts, the positions of the pointers 50, 51, 52 and 53 will be moved upwardly to show the amounts of the various components contained in 16 pounds of barley. This operation may be repeated as many times as may be necessary to show the amounts of the designated nutrients contained in a predetermined amount of barley.

Assuming now that the actuator device shown in Fig. 3a representing red clover is placed on the guide strips and moved forward to impart movements to the horizontal belts E, F, G and H for distances equal to the respective lengths of its actuator scales 61, 62, 63 and 64. The linear movement of the several horizontal belts are transmitted through the operating and companion pulleys to the vertical belts I, J, K and L and the pointers carried thereby are moved to positions representing the additional quantity of protein, total digestible nutrients, fat and fiber supplied by the increment of 8 pounds of red clover. The same operations may be carried out with similar actuating elements representing various other feeds which might be used in providing a desired stock ration having prescribed amounts of protein, total digestive nutrients, fat and fiber. When the computation is completed the pointers 50, 51, 52 and 53 may be manually returned to their starting positions by sliding them lengthwise of the belts on which they are frictionally supported.

When the invention is used in connection with computations other than stock feed, the graduations on the actuator scales are made to represent the proportions of the various components considered in the computation. For example, if the computation deals with the nutrients of a diet composed of meats and vegetables, the nutrient values may be expressed in the amounts of calories and vitamins contained in selected increments of food. As an alternative, the food values may be expressed in proteins, fats and minerals. If the food used does not contain one or more of the components desired, the actuator scale representing such component is merely adjusted to zero.

I claim:

1. A mechanical counter for computing and indicating the aggregate value of a plurality of components included, in different percentages, in a predetermined quantity comprising separate totalizing and indicating means for each component, including, in each case, a fixed scale having graduations thereon of predetermined linear value and a pointer element movable a predetermined linear distance lengthwise of its associated scale to represent the individual value of its component, separate operating means for each pointer element, and an actuator comprising a plurality of measuring elements of different lengths and corresponding in each case to the value of the several components represented and adapted to impart concomitant measured movements to each of said pointer operating means, whereby the several pointer elements are moved distances along their associated scales corresponding to the effective lengths of said measuring elements.

2. A mechanical counter for computing and indicating the separate aggregate values of a plurality of substances contained in a measured quantity of material; said counter comprising separate totalizing and indicating mechanisms for each substance contained in the material and comprising, in each case, a fixed scale and a movable pointer mechanism associated therewith and supported for movement lengthwise of its associated scale, each said scale having spaced graduations thereon of magnitudes different from the graduations on the other scales; means for imparting movement to the several pointer mechanisms, including a manually-operated actuator representing a measured quantity of said material and provided with a plurality of measuring elements, each based upon a total percent linear value proportional to the total percent linear value of its associated scale and representing, by its effective length, the value of its represented substance contained in such measured quantity of material, whereby the several measuring elements, upon movement of said actuator in one direction, impart measured movements corresponding to their effective individual lengths to their associated pointer mechanisms.

3. A mechanical counter for computing and indicating the separate aggregate values of a plurality of substances contained in a measured quantity of material; said counter comprising a totalizing and indicating mechanism for each substance, including a fixed scale having spaced graduations thereon representing percentage measures of a predetermined linear value and separate pointer mechanisms associated with each of said scales and supported for movement lengthwise of said scales; separate operating means for imparting movement to the several pointer mechanisms; and an actuating element provided with a body portion and with a plurality of measuring elements, each measuring element being based upon a total percent linear value which is proportional to the total percent linear value of its associated indicating scale and is adjustably supported on said body, whereby the several measuring elements may be adjusted to vary the lengths thereof which project outwardly from one side of said body.

4. A mechanical counter for computing and indicating the separate aggregate amounts of selected nutrients contained in different proportions in a measured amount of material and comprising a totalizing and indicating mechanism for each selected nutrient contained in the material, and comprising in each case movable elements and a flexible scale associated therewith having linear spacings thereon of magnitudes differing from the linear spacings on the other scales, separate operating means for imparting movements to the movable elements of the several totalizing and indicating mechanisms, and an actuating element representing the material used and provided with measuring elements adjustably supported thereon to represent by linear measures the several amounts of selected nutrients contained in the material and each measuring element being adapted to engage and actuate its associated operating means for a distance corresponding to the linear value of such measuring element.

5. A mechanical counter for computing and indicating the separate aggregate amounts of selected substances contained in different proportions in a measured amount of material comprising a totalizing and indicating mechanism for each selected substance contained in the material, each mechanism including a movable pointer and an indicating scale having spaced graduations thereon representing percentage measures of a predetermined linear value, and means for imparting movements to the several pointers, including a unitary actuator representing the material used and provided with a body portion and with a plurality of measuring elements, each measuring element being associated with one of said indicating scales and being based upon a total percent linear value proportional to the total percent linear value of its associated indicating scale and is also adjustably supported on the body, whereby the several measuring elements may be adjusted to represent the amounts of the selected substances contained in the material.

FREDERICK A. G. KOENIG.

REFERENCES CITED

The following references are of record in the file of this patent:

UNITED STATES PATENTS

| Number | Name | Date |
|---|---|---|
| 823,219 | Hensley | June 12, 1906 |
| 1,136,101 | Church | Apr. 20, 1915 |
| 1,871,060 | Hoffman | Aug. 9, 1932 |
| 2,097,835 | Epps | Nov. 2, 1937 |
| 2,127,769 | Esgro | Aug. 23, 1938 |
| 2,356,561 | Bennett | Aug. 22, 1944 |
| 2,405,687 | Cleaver | Aug. 13, 1946 |

FOREIGN PATENTS

| Number | Country | Date |
|---|---|---|
| 236,903 | Great Britain | July 16, 1925 |